United States Patent
Kanno

[11] Patent Number: 5,998,005
[45] Date of Patent: Dec. 7, 1999

[54] SHEET MADE OF POLYESTER RESIN COMPOSITION

[75] Inventor: Hiroshi Kanno, Tokyo, Japan

[73] Assignee: Sumitomo Bakelite Company Limited, Tokyo, Japan

[21] Appl. No.: 09/280,050

[22] Filed: Mar. 29, 1999

[30] Foreign Application Priority Data

Mar. 30, 1998 [JP] Japan ................... 10-083972

[51] Int. Cl.⁶ .............................. B32B 7/02; C08G 63/00
[52] U.S. Cl. ..................... 428/221; 582/272; 582/307; 582/308.6; 525/437; 524/753; 524/773; 264/173.1; 264/173.18; 264/175; 428/327; 428/480
[58] Field of Search ..................... 528/272, 307, 528/308.6; 525/437; 524/753, 773; 264/173.1, 173.18, 175; 428/221, 327, 480

[56] References Cited

U.S. PATENT DOCUMENTS 4,590,119  5/1986  Kawakami et al. .................... 428/216

5,817,721  10/1998  Warzelhan et al. .................... 525/437

FOREIGN PATENT DOCUMENTS

A57-8238   1/1982  Japan .
A7278418  10/1995  Japan .

*Primary Examiner*—Samuel A. Acquah
*Attorney, Agent, or Firm*—Smith, Gambrell & Russell, LLP

[57] ABSTRACT

The present invention provides a sheet made of a polyester resin composition, which composition shows no adhesion to calender rolls and can be made into a sheet by calendering. Specifically, the present invention provides a sheet made of a polyester resin composition, wherein the polyester resin composition comprises 100 parts by weight of a copolyester resin obtained by replacing, in production of polyethylene terephthalate resin, 10 to 40 mole % of the ethylene glycol component with cyclohexanedimethanol, and 0.1 to 2 parts by weight of a fatty acid ester lubricant.

12 Claims, No Drawings

SHEET MADE OF POLYESTER RESIN COMPOSITION

The present invention relates to a sheet made of a polyester resin composition which is moldable by calendering. More particularly, the present invention relates to a sheet made of a polyester resin composition, which composition has a particular formulation, shows no adhesion to calender rolls, and can be made into a sheet by calendering at high productivity.

In recent years, polyester resin-based sheets have found wider applications, as (1) cases for electronic or electric appliances, stationery, etc., (2) packaging films or sheets for foods, medicines, etc., (3) lid materials for molded containers, (4) containers for blister packaging, (5) films or sheets for construction and (6) so forth, or as sheets for cards (e.g. IC card, magnetic stripe card and ID card), which are produced by laminating a core sheet and an overlay sheet and contain inside a module having IC chips, etc. mounted thereon.

These polyester resin-based sheets have generally been produced by subjecting resin pellets to melt extrusion. In such sheet production by melt extrusion, the speed of sheet production has been small, the productivity has been low, and the thickness accuracy has been low.

Meanwhile, polyvinyl chloride resin-based sheets have been produced not only by extrusion but also by calendering. In the sheet production by calendering, the speed of sheet production is large and the thickness accuracy is high.

When it is tried to produce a sheet from a polyester resin by calendering, the polyester resin adheres strongly to the calender rolls used, because of its properties, making the sheet production substanatially impossible. Decreasing temperature of calender rolls worsens the surface roughness of the resultant sheet, making the sheet production substantially impossible as well.

The resent invention aims at providing a sheet made of a polyester resin composition, which composition shows no adhesion to calender rolls and enables sheet production by calendering at a high productivity.

The present inventor made a study in order to achieve the above aim. As a result, the present inventor found out that adhesion of polyester resin to calender rolls can be prevented if there is appropriate lubricity when the polyester resin and the calender rolls are contacted with each other.

A further study was made based on the above finding. As a result, a conclusion was obtained that (1) it is difficult to impart lubricity to calender rolls themselves, (2) and therefore, it is necessary to impart lubricity to a sheet to be produced, and (3) in order to impart lubricity to the sheet itself, it is effective to beforehand add a lubricity-imparting agent to a polyester resin.

The polyester resin is most representatively a polyethylene terephthalate resin; however, the polyethylene terephthalate resin is difficult to calender because of its crystallinity. Investigation by the present inventor revealed that only a copolyester resin obtained by replacing, in production of polyethylene terephthalate resin, 10 to 40 mole % of the ethylene glycol component with cyclohexanedimethanol, is amorphous.

Investigation was also made on the lubricity-imparting agent to be added to the polyester resin. As a result, it was found out that a fatty acid ester lubricant has good compatibility with the polyester resin, is easy to knead with the polyester resin, does not impair the sheetability of the polyester resin, gives a sheet of good properties (e.g. appearance and other properties), and poses no problem in calendering.

The present invention has been completed based on the above findings. The present invention provides (1) a sheet made of a polyester resin composition, wherein the polyester resin composition comprises
100 parts by weight of a copolyester resin obtained by replacing, in production of polyethylene terephthalate resin, 10 to 40 mole % of the ethylene glycol component with cyclohexanedimethanol, and
0.1 to 2 parts by weight of a fatty acid ester lubricant;

(2) a sheet made of a polyester resin composition, wherein the polyester resin composition is a combination of the above polyester resin composition and a white pigment (the amount of the white pigment is 1 to 20 parts by weight per 100 parts by weight of the copolyester resin);

(3) a sheet made of the above resin composition, which has been subjected to calendering; and (4) a sheet for a card made of the above resin composition, which has been subjected to embossing on at least one side so as to have a surface roughness Ra of 0.5 to 15 µm.

The present invention is hereinafter described in detail.

In the present invention, there is used, as the polyester resin, a copolyester resin obtained by replacing, in production of polyethylene terephthalate resin, 10 to 40 mole % of the ethylene glycol component with cyclohexanedimethanol. When the amount of the ethylene glycol component replaced is less than 10 mole %, the resulting copolyester has crystallinity, requires a narrow temperature range in calendering, gets cloudy, and is unusable. When the amount of the ethylene glycol component replaced is more than 40 mole %, the resulting copolyester is difficult to calender owing to the crystallinity, and the resultant sheet is low in tensile strength and bending modulus of elasticity, limp and unusable. Therefore, the amount of the ethylene glycol component replaced must be 10 to 40 mole %, preferably 20 to 35 mole %.

As the fatty acid ester lubricant to be mixed with the polyester resin, there can be mentioned butyl stearate, cetyl palmitate, stearic acid monoglyceride, stearic acid diglyceride, stearic acid triglyceride, a montanic acid ester, a montanic acid ester partially saponified with calcium, a wax ester, an aliphatic dicarboxylic acid ester, etc. These compounds can be used singly or in admixture of two or more kinds.

When the proportion of the fatty acid ester lubricant used is too small, there appears no addition effect of the lubricant and the problem of polyester resin adhesion to calender rolls is not eliminated. When the proportion is too large, the resulting sheet has low transparency, the blooming of fatty acid ester lubricant on the sheet surface is striking, and the sheet has low commercial value. Hence, in the present polyester resin composition, the fatty acid ester lubricant is used in an amount of 0.1 to 2 parts by weight, preferably 0.3 to 1 part by weight per 100 parts by weight of the copolyester resin.

In the present invention, the polyester resin composition may comprise, in addition to the copolyester resin and the fatty acid ester lubricant, various additives ordinarily used in such compositions, for example, another lubricant, a pigment, an antistatic agent, a light stabilizer, an antioxidant, an inorganic filler, a reinforcing agent, etc.

As the other lubricant, there can be used a fatty acid type, a fatty acid amide type, a fatty acid bisamide type, a fatty acid ketone type, a higher alcohol type, etc. As the pigment, there can be used organic pigments such as Phthalocyanine Blue, Phthalocyanine Green, Isoindolinone Yellow, Quinacridone Red, Perylene Red and the like; and inorganic pigments such as ultramarine, cobalt blue, Chrome Oxide Green, titanium white, carbon black, red iron oxide, cadmium yellow, cadmium red and the like.

As the antistatic agent, there can be used a cationic type, an anionic type and a nonionic type. As the light stabilizer, there can be used a benzophenone type, a benzotriazole type, a hindered amine type, a salicylic acid ester type, etc. As the inorganic filler, there can be used calcium carbonate, aluminum hydroxide, magnesium hydroxide, talc, feldspar, silica, hydrotalcite, etc.

The sheet made of a polyester resin composition, of the present invention can be produced by mixing and kneading the copolyester resin, the fatty acid ester lubricant and, as necessary, additives in required proportions to prepare a mixture and then subjecting the mixture to ordinary calendering. Alternatively, the sheet is produced by adding, to the copolyester resin, the fatty acid ester lubricant and, as necessary, additives in high concentrations to prepare a master batch, mixing and kneading the master batch with the further copolyester resin to prepare a mixture of required formulation, and subjecting the mixture to ordinary calendering. The produced sheet is superior also in secondary processing such as vacuum forming and the like and becomes a product suitable as a food-packaging material, a construction material, etc.

When the present sheet made of a polyester resin composition is subjected to embossing at one or both sides to produce an embossed sheet, the embossed sheet must have a surface roughness Ra of 0.5 to 15 $\mu$m, preferably 1 to 10 $\mu$m. When the surface roughness Ra is less than 0.5 $\mu$m, the embossed sheet causes blocking, inviting a problem in card production from the sheet. When the surface roughness Ra is more than 15 $\mu$m, there occurs a reduction in printability (e.g. printing ink adhesion, finished appearance of adhered ink, and adaptability for printing machines). There is no particular restriction as to the embossing method used; embossing can be conducted, for example, by using embossing rolls whose final roll has been subjected to a surface treatment by sand matting or engraving, or by passing a preheated sheet between an embossing roll and a pressure roll.

When the sheet of the present invention is used as a core sheet for a card, a white pigment is added to the polyester resin composition in order for the resulting sheet to have a hiding power. The amount of the white pigment added is 1 to 20 parts by weight, preferably 3 to 18 parts by weight per 100 parts by weight of the copolyester resin. When the amount is less than 1 part by weight, the resulting sheet has no sufficient hiding power. When the amount is more than 20 parts by weight, the resulting composition is inferior in processability, making difficult sheet production.

There is no particular restriction as to the kind of the white pigment used; however, preferred is an inorganic compound such as titanium oxide, barium sulfate, calcium carbonate, aluminum hydroxide, magnesium hydroxide, talc, hydrotalcite or the like.

According to the present invention, a polyester resin-based sheet can be produced by calendering (this has heretofore been impossible) and, moreover, in a significantly shorter time and at a lower temperature as compared with when produced by conventional extrusion. As a result, the cost of producing a polyester resin-based sheet is strikingly reduced and the sheet cost is greatly lowered. Furthermore, the calendering used in the present invention uses a lower temperature and gives shorter heat history than the extrusion and hence improves the decrease in properties such as impact resistance which is caused by hydrolysis of polyester resin.

The present invention is described specifically below by way of Examples and Comparative Examples. However, the present invention is not restricted to these Examples.

EXAMPLES 1 to 7

There were mixed, in the proportions shown in Table 1, a copolyester resin obtained by replacing, in production of polyethylene terephthalate resin, 30 mole % of the ethylene glycol component with cyclohexanedimethanol, and a fatty acid ester lubricant (stearic acid monoglyceride, a montanic acid ester or a montanic acid ester partially saponified with calcium). The resulting mixture was subjected to ordinary calendering at 160° C. to produce a 0.3 mm-thick sheet made of a polyester resin composition, of the present invention. Observation was made on the roll lubricity during calendering and the appearance (transparency, etc.) of the produced sheet made of the polyester resin composition. The results are shown in Table 1.

TABLE 1

| | Examples | | | | | | |
|---|---|---|---|---|---|---|---|
| | 1 | 2 | 3 | 4 | 5 | 6 | 7 |
| Copolyester resin (parts by weight) | 100 | 100 | 100 | 100 | 100 | 100 | 100 |
| Stearic acid monoglyceride (parts by weight) | 0.2 | 0.8 | 1.8 | | | | |
| Montanic acid ester (parts by weight) | | | | 0.9 | 1.9 | | |
| Montanic acid ester partially saponified with calcium (parts by weight) | | | | | | 0.7 | 1.5 |
| Roll lubricity | Δ | ○ | ○ | ○ | ○ | ○ | ○ |
| Appearance (transparency, etc.) | ○ | ○ | Δ | ○ | Δ | ○ | Δ |

Roll lubricity:
○: There is no adhesion of sheet to calender rolls.
Δ: There is slight adhesion of sheet, but it gives no problem in calendering.
X: There is severe adhesion and calendering is impossible.
Appearance (transparency, etc.):
○: Transparency, etc. are good and there is no appearance problem.
Δ: Transparency, etc. are slightly bad, but sheet is usable.
X: Transparency, etc. are bad and sheet is unusable.

COMPARATIVE EXAMPLES 1 to 7

A lubricant (the montanic acid ester used in Examples 4 and 5, stearic acid, a calcium soap or a polyethylene wax) of the amount shown in Table 2 was mixed into 100 parts by weight of one of three different copolyester resins different in the amount (mole %) of replaced ethylene glycol component as shown in Table 2. Using the resulting mixture, a sheet for comparison was produced in the same manner as in Examples 1 to 7. Observation was made on the roll lubricity during calendering and the appearance (transparency, etc.) of the produced sheet similarly to Examples 1 to 7. The results are shown in Table 2.

TABLE 2

|  | Comparative Examples | | | | | | |
| --- | --- | --- | --- | --- | --- | --- | --- |
|  | 1 | 2 | 3 | 4 | 5 | 6 | 7 |
| Amount of ethylene glycol component replaced in 100 parts by weight of copolyester resin, (mole %) | 30 | 30 | 30 | 30 | 30 | 3 | 60 |
| Montanic acid ester (parts by weight) |  | 3 |  |  |  | 0.7 | 0.7 |
| Stearic acid (part by weight) |  |  | 0.7 |  |  |  |  |
| Calcium soap (part by weight) |  |  |  | 0.7 |  |  |  |
| Polyethylene wax (part by weight) |  |  |  |  | 0.7 |  |  |
| Roll lubricity | X | ○ | X | X | X | X | X |
| Appearance (transparency, etc.) | — | X | — | — | — | — | — |

Roll lubricity:
○: There is no adhesion of sheet to calender rolls.
X: There is severe adhesion and calendering is impossible.
Appearance (transparency, etc.):
X: Transparency, etc. are bad and sheet is unusable.
—: No evaluation because calendering was impossible.

EXAMPLES 8 TO 10 AND COMPARATIVE EXAMPLES 8 to 9

The mixture used in Example 2, 4 or 6 was subjected to the same calendering as in Examples 2, 4 and 6. The produced sheet was preheated to 150° C. and passed between an embossing roll and a pressure roll for embossing under different conditions, whereby a sheet for a card was produced. The sheet was evaluated for surface roughness Ra, blocking property and printability. The results are shown in Table 3.

TABLE 3

|  | Examples | | | Comp. Examples | |
| --- | --- | --- | --- | --- | --- |
|  | 8 | 9 | 10 | 8 | 9 |
| Copolyester resin (parts by weight) | 100 | 100 | 100 | 100 | 100 |
| Stearic acid monoglyceride (part by weight) | 0.8 |  |  |  |  |
| Montanic acid ester (part by weight) |  | 0.9 |  | 0.9 | 0.9 |
| Montanic acid ester partially saponified with calcium (part by weight) |  |  | 0.7 |  |  |
| Surface roughness Ra ($\mu$) | 6 | 6 | 8 | 0.4 | 20 |
| Blocking property | ○ | ○ | ○ | X | ○ |
| Printability | ○ | ○ | ○ | ○ | X |

Blocking property:
○: There is no sheet-to-sheet blocking.
Δ: There is slight blocking, but sheet is marginally usable.
X: Sheet is unusable owing to blocking.
Printability:
○: There is no problem in printing ink adhesion and finished appearance of adhered ink, and printability is good.
Δ: There is slight problem in printing ink adhesion and finished appearance of adhered ink, but printing is marginally possible.
X: Printability is bad.

EXAMPLES 11 TO 13 AND COMPARATIVE EXAMPLES 10 TO 11

The polyester resin composition of Example 4 was mixed with a white pigment (titanium oxide) in the proportions shown in Table 4, and the resulting mixture was 5 made into a core sheet for a card. The sheet processability of the mixture and the hiding power of the produced sheet were evaluated. The results are shown in Table 4.

TABLE 4

|  | Examples | | | Comp. Examples | |
| --- | --- | --- | --- | --- | --- |
|  | 11 | 12 | 13 | 10 | 11 |
| Copolyester resin (parts by weight) | 100 | 100 | 100 | 100 | 100 |
| Montanic acid ester (part by weight) | 0.9 | 0.9 | 0.9 | 0.9 | 0.9 |
| Titanium oxide (parts by weight) | 2.5 | 10 | 19 | 0.5 | 25 |
| Hiding power | Δ | ○ | ○ | X | ○ |
| Sheet processability | ○ | ○ | Δ | ○ | X |

Hiding power:
○: There is no problem in hiding power after formation of card, and sheet is usable.
Δ: Hiding power is slightly insufficient, but sheet is marginally usable.
X: There is no hiding power and sheet is unusable.
Sheet processability:
○: There is no problem in sheet processability during calendering.
Δ: There is slight problem, but sheeting is marginally possible.
X: Sheet processing is impossible.

What is claimed:

1. A sheet made of a polyester resin composition, wherein the polyester resin composition comprises 100 parts by weight of a copolyester resin obtained by replacing, in production of polyethylene terephthalate resin, 10 to 40 mole % of the ethylene glycol component with cyclohexanedimethanol, and 0.1 to 2 parts by weight of a fatty acid ester lubricant.

2. A sheet according to claim 1, wherein the polyester resin composition further comprises 1 to 20 parts by weight of a white pigment.

3. A sheet according to claim 1, which has been subjected to calendering.

4. A sheet according to claim 2, which has been subjected to calendering.

5. A sheet according to claim 1, which has been used for a card.

6. A sheet according to claim 2, which has been used for a card.

7. A sheet according to claim 5, which has been subjected to embossing on at least one side so as to have a surface roughness Ra of 0.5 to 15 $\mu$m.

8. A sheet according to claim 6, which has been subjected to embossing on at least one side so as to have a surface roughness Ra of 0.5 to 15 $\mu$m.

9. A sheet according to claim 1, wherein the fatty acid ester lubricant is selected from the group consisting of butyl stearate, cetyl palmitate, stearic acid monoglyceride, stearic acid diglyceride, stearic acid triglyceride, a montanic acid ester, a montanic acid ester partially saponified with calcium, and a wax ester.

10. A sheet according to claim 2, wherein the fatty acid ester lubricant is selected from the group consisting of butyl stearate, cetyl palmitate, stearic acid monoglyceride, stearic acid diglyceride, stearic acid triglyceride, a montanic acid ester, a montanic acid ester partially saponified with calcium, and a wax ester.

11. A sheet according to claim 1, wherein the fatty acid ester lubricant is selected from the group consisting of stearic acid monoglyceride, a montanic acid ester and a montanic acid ester partially saponified with calcium.

12. A sheet according to claim 2, wherein the fatty acid ester lubricant is selected from the group consisting of stearic acid monoglyceride, a montanic acid ester and a montanic acid ester partially saponified with calcium.

* * * * *

Adverse Decisions In Interference

Patent No. 5,998,005, Hiroshi Kanno, SHEET MADE OF POLYESTER RESIN COMPOSITION, Interference No. 104,663, final judgment adverse to the patentee rendered March 15, 2001, as to claims 1, 3, 5, 9 and 11.

*(Official Gazette April 17, 2001)*